United States Patent [19]

Shimomura et al.

[11] Patent Number: 5,150,132
[45] Date of Patent: Sep. 22, 1992

[54] MATERIAL CONTAINING A CURED SUBSTANCE FOR USE WITH A LIQUID EJECTION RECORDING HEAD AND APPARATUS

[75] Inventors: Masako Shimomura; Hiromichi Noguchi, both of Kanagawa; Akihiko Shimomura, Tokyo, all of Japan

[73] Assignee: Canon Kabushiki Kaisha, Tokyo, Japan

[21] Appl. No.: 505,599

[22] Filed: Apr. 6, 1990

[30] Foreign Application Priority Data

Apr. 7, 1989 [JP] Japan .................. 1-086898

[51] Int. Cl.⁵ .................................. B41V 2/05
[52] U.S. Cl. ........................ 346/140 R; 346/1.1; 528/249; 528/361
[58] Field of Search ........... 346/140, 1.1; 528/361, 528/365, 249

[56] References Cited

U.S. PATENT DOCUMENTS

| | | | |
|---|---|---|---|
| 2,955,101 | 10/1960 | Bruin | 528/365 X |
| 3,957,727 | 5/1976 | McLean | 528/366 X |
| 4,417,251 | 11/1983 | Sugitani | 346/140 |
| 4,521,787 | 6/1985 | Yokota | 346/140 |
| 4,657,631 | 4/1987 | Noguchi | 156/655 |
| 4,688,052 | 8/1987 | Inamoto et al. | 346/140 |
| 4,688,053 | 8/1987 | Noguchi et al. | 346/140 |
| 4,688,055 | 8/1987 | Noguchi et al. | 346/140 |
| 4,688,056 | 8/1987 | Noguchi et al. | 346/140 |
| 4,689,640 | 8/1987 | Shimomura . | |
| 4,839,399 | 6/1989 | Sato et al. | 522/14 |
| 4,839,400 | 6/1989 | Sato et al. | 522/14 |
| 4,839,668 | 6/1989 | Sato et al. | 346/140 |
| 4,839,669 | 6/1989 | Sato et al. | 346/140 |

OTHER PUBLICATIONS

Bruins, Paul F.; Epoxy Resin Technology; Intesscience Publishers, 1970, pp. 12–13.

*Primary Examiner*—Joseph W. Hartary
*Attorney, Agent, or Firm*—Fitzpatrick, Cella, Harper & Scinto

[57] ABSTRACT

A material for a liquid ejection ink-jet recording apparatus that is contactable with a recording liquid wherein the material is formed by a cured substance made from cyclic aliphatic epoxy resin and acid anhydride. The material is used in producing a liquid ejection recording head. The head is included in a liquid recording apparatus.

14 Claims, 7 Drawing Sheets

MATERIAL CONTAINING A CURED SUBSTANCE FOR USE WITH A LIQUID EJECTION RECORDING HEAD AND APPARATUS

BACKGROUND OF THE INVENTION

1. Field of the Invention

This invention relates to a material for liquid ejection recording, a recording head using the material, and a liquid ejection recording apparatus including the recording head.

2. Description of the Related Art

There has been known a liquid ejection recording method (an ink-jet recording method) which performs recording on a recording material (for example, paper) by discharging a recording liquid (ink) from orifices (discharge openings) provided in a recording head. It has also been known that a liquid ejection recording apparatus (an ink-jet recorder) utilizing this recording method is superior in various points, such as low noise, high-speed recording, color recording and the like.

As for a recording head used in a liquid ejection recording apparatus, there has been known a configuration consisting of at least two plates (a substrate, a top plate, and the like) joined to each other. This configuration is advantageous when multiple nozzles are formed, that is, when a plenty of discharge openings (orifices) are regularly arranged. Such kinds of recording heads have been described, for example, in U.S. Pat. No. 4,417,251 and Japanese Patent Public Disclosure (Kokai) No. 62-59672 (1987).

In Japanese Patent Public Disclosure (Kokai) No. 62-59672 (1987), there has been described a recording head, the perspective view and cross-sectional view of which are shown in FIGS. 1(a) and 1(b), respectively. The recording head is a multinozzle recording head having the configuration in which a liquid path 13 for a recording liquid is formed on a substrate 11 using a photosensitive resin film (a cured film of photosensitive resin) 12, to which a top plate 15 having a liquid reservoir 14 dug therein for storing the recording liquid is connected.

Inorganic glass is generally used for the top plate 15. The top plate 15 made of borosilicate glass has already been practically utilized.

When borosilicate glass is used for the top plate 15, there are problems in that cost for processing, such as processing of digging the above-described liquid reservoir 14, is high, it is difficult to sufficiently increase accuracy in the processing, and the like. Furthermore, there sometimes arise problems in that fine glass chips are produced from microcracks generated at the moment of the processing or the like, which penetrate into the liquid path 13 or block an inlet portion of the liquid path 13, and, as a result, the liquid path 13 is clogged, and the like.

Accordingly, it has been studied to solve the problems of the processing cost, processing accuracy, clogging of the liquid path and the like caused by inorganic glass as described above by providing the top plate 15 using resin in place of inorganic glass. However, the top plate 15 made of resin must satisfy the following properties in addition to the processing properties as described above.

First, it is required that the top plate 15 has an excellent recording-liquid-resistant property. That is, in the configuration of the head, the top plate 15 is a member constituting one surface of a wall material for the liquid path 13 and the liquid reservoir 14, and in most cases contacts the recording material when the head is operating. If the recording-liquid-resistant property of resin is inferior, there arises, for example, the problem that impurities from the resin are dissolved into the recording liquid from a portion contacting the recording liquid.

The impurities dissolved into the recording liquid include various kinds of additives (release agents, plasticizers, polymerization catalysts, flame retarders and the like) contained within the resin, and the resin itself. If such impurities are dissolved into the recording liquid, the properties of the recording liquid, such as viscosity, suface tension, pH, chromaticity and the like, sometimes change, and hence the ejection performance of the liquid from the recording head, the quality and preservative property of printed matter, and the like sometimes deteriorate. Furthermore, since a recording operation is performed by discharging a recording liquid from fine orifices (discharging openings) in a liquid ejection recording apparatus, dissolved substances within the recording liquid are deposited near discharge openings, which produce so-called clogging or a state close to clogging, causing nondischarge of the recording liquid.

For example, it has been known that, if calcium, magnesium and the like are dissolved into the recording liquid, they react with carbon dioxide near the discharge openings, and calcium carbonate and magnesium carbonate are deposited. Furthermore, in a liquid ejection recording apparatus of the type utilizing heating elements as discharge-energy generating elements, dissolved substances, such as specific polyvalent metal ions, colloidal silica and the like, are in some cases thermally decomposed on the heating elements. Decomposed deposits coat the heating elements, and remarkably weaken (hinder) the transmission of the thermal energy produced by the heating elements to the recording liquid.

As for the recording-liquid-resistant property, in addition to the above-described dissolution of the impurities, there is also the problem that the recording liquid is impregnated in a portion contacting the recording liquid of the top plate 15 made of resin to swell the portion and the smoothness of the surface is thereby lost.

The above-described problems relating to the recording-liquid-resistant property are not problems which occur only for the top plate 15, but are problems which occur when resin is used for any member having a surface contacting the recording liquid, that is, a member which functions as a wall material for the recording liquid. The members which function as wall materials for the recording liquid are, for example, an ink cartridge for housing the recording liquid, an ink tank on carriage, rigid members (a supply/recovery meter, a cap, a waste-liquid tank and the like) around the liquid path, and the like, in addition to the top plate.

Further referring to the top plate 15, it must be transparent in order to perform patterning for the photosentivitive resin film 12 by illuminating light through the top plate 15. Accordingly, resin materials having appropriate transparency, such as acrylic resin materials, diallylphthalate resin materials, diallylcarbonate resin materials, epoxy resin materials induced from epichlorohydrin, and the like are candidates for the constituent materials for the top plate 15. However, all of these resin materials sometimes cause problems in the above-described recording-liquid-resistant property.

Furthermore, since these resin materials have low glass transition temperatures, there sometimes arise problems in the heat-resistive property in working processes in that stress is produced within the resin materials due to heating during assembling and working operations of a recording head to cause peeling, warp and the like.

SUMMARY OF THE INVENTION

It is an object of the present invention to provide a liquid ejection recording apparatus having a wall material for a recording liquid made of resin which is satisfactory in the various properties described above (in particular, the recording-liquid-resistant property).

According to the present invention, it is possible to provide a material for liquid ejection recording which can fully satisfy requirements for various properties.

It is a further object of the present invention to provide, in particular, an excellent recording-liquid-resistant property, and to satisfy practical requirements, such as a heat-resistant property, transparency, workability, cost and the like, for a liquid ejection recording head and a supply system using the material.

It is a still further object of the present invention to provide a recording head and/or a recording apparatus which uses the material in a portion contacting a recording liquid, which can maintain extremely stable properties for a long period at low cost, and which has excellent performance also from a practical point of view.

It is still another object of the present invention to provide a material for liquid ejection recording contactable with a recording liquid, the material comprising a cured substance made from cyclic aliphatic epoxy resin and acid anhydride.

It is still a further object of the present invention to provide a liquid ejection recording head having discharge openings for discharging a recording liquid, comprising at least a part of a portion, which can contact the recording liquid and constitutes the liquid ejection recording head, formed by a cured substance made from cyclic aliphatic epoxy resin and acid anhydride.

It is still another object of the present invention to provide a liquid ejection recording apparatus comprising a control circuit unit for driving a liquid ejection recording head provided for discharging a recording liquid, a platen for locating therealong a recording member for being subjected to recording by applying the recording liquid, and the liquid ejection recording head, wherein at least a part of a member of the apparatus contactable the liquid ejection recording head and/or the recording liquid is made of a cured substance made from cyclic aliphatic epoxy resin and acid anhydride.

DETAILED DESCRIPTION OF THE PREFERRED EMBODIMENTS

Figure 1A:
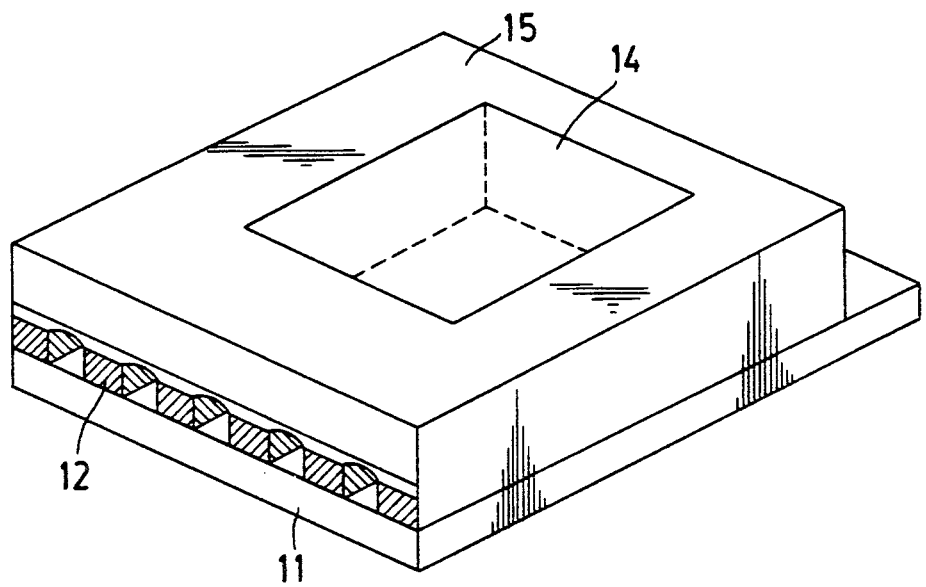
FIGS. 1(a) and 1(b) are a perspective view and a cross-sectional view, in a model, of a liquid ejection recording head, respectively.
Figure 1B:
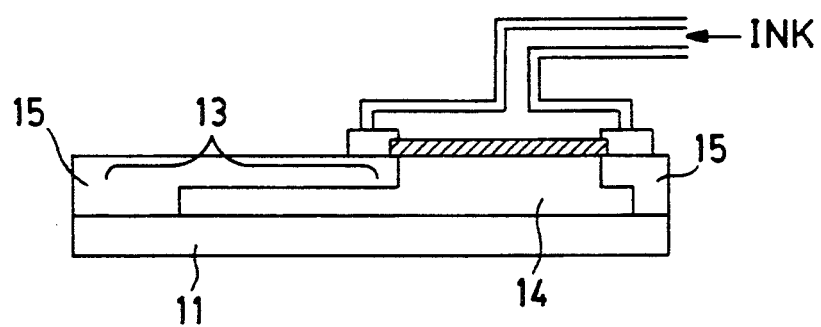

The inventors of the present invention have performed various studies in order to achieve the objects as described above, and have finally found that a cured substance from cyclic aliphatic epoxy resin and acid anhydride is suitable as a wall material for a recording liquid. The present invention has thus been completed.

The "wall material for a recording liquid" in the present invention indicates a constituent member of a liquid ejection recording apparatus, having a surface contacting the recording liquid. The constituent members are, for example, a top plate, an ink cartridge, an ink tank on carriage, rigid members around a liquid path, and the like.

Since a wall material for a recording liquid in an apparatus according to the present invention is made of resin, the material is more advantageous than a conventional wall material for a recording liquid made of inorganic glass in processing cost and accuracy and the like, and is also less expensive.

Furthermore, since a wall material for a recording liquid in an apparatus according to the present invention is made of cyclic aliphatic epoxy resin and acid anhydride, there hardly occur the dissolution of impurities into the recording liquid, or the swelling of the wall material and the like. That is, the material has an excellent recording-liquid-resistant property.

Although the reasons why the inventive material has an excellent recording-liquid-resistant property are uncertain, the reasons are probably that materials (epichlorohydrin-type compounds and the like) causing impurities are not used when a cyclic aliphatic epoxy resin material is produced, the cured substance is chemically stable because its cross-linking density is high, and the like.

A wall material for a recording liquid in an apparatus according to the present invention has a relatively high glass transition point, and hardly produces peeling, warp and the like due to heating at the moment of the assembly and processing operations of a recording head. That is, the material has an excellent heat-resistant property.

A wall material for a recording liquid in an apparatus according to the present invention also has excellent transparency which is considered to be due to the use of an aliphatic resin material. Hence, the material is particularly useful as a wall material for a recording liquid for which transparency is needed, for example, a top plate or the like.

The wall material for a recording liquid in the present invention will now be explained in detail.

As the cyclic aliphatic epoxy resin material used for constituting the wall material for a recording liquid, a resin material represented by the following general formula (a) may, for example, be used:

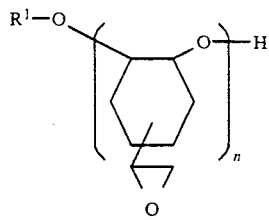

(in the formula, R¹ indicates a residual radical of monohydric or polyhydric alcohol, and n=2-15).

As R¹ in the above-described formula (a), there exist, for example, $CH_3$, $CH_2=CHCH_2$, $CH_3CH_2C(CH_2OH)_2CH_2$ $(CH_3)CH$, $CH_3CH$ $(CH_2OH)CH_2$, $CH_3CH_2-$, $CH_3CH_2CH_2-$, $(CH_3)_2CH-$, $CH_3CH_2CH_2CH_2-$, $(CH_3)_2CHCH_2-$, and the like.

The wall material for a recording liquid made by a resin material represented by the general formula (a) has, in particular, a high glass transition temperature and an excellent heat-resistant property. In addition, since the material can be formed by high-speed molding, such as transfer molding, it has an excellent mass-production capability.

As another kind of cyclic aliphatic epoxy resin material, there is a resin material represented by the following general formula (b):

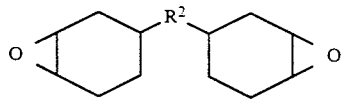

(in the formula, $R^2$ indicates $CH_2CO_2R^3CO_2CH_2$ or $CH_2CO_2$, where $R^3$ indicates a divalent hydrocarbon radical having a valence bond or 1-9 carbon atoms).

As still another kind of cyclic aliphatic epoxy resin material, there is a resin material represented by the following general formula (c):

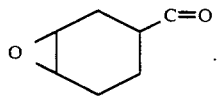

Since a wall material for a recording liquid made of a resin material represented by the general formula (b) or (c) can, in particular, be formed by precision molding, such as casting molding, it can be produced as a high-precision component. A resin represented by the general formula (a) can be obtained by epoxidation of a residual vinyl radical in a polymer expressed by the following general formula (d), which is provided by the open-ring polymerization of a resin represented by the general formula (c), by peracetic acid or hydrogen peroxide:

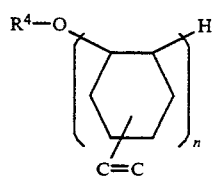

(in the formula, R⁴ indicates a residual radical in monohydric or polyhydric alcohol, and n indicates a numeral between 2-15).

A resin material represented by the general formula (a) is also available as a commercial product (for example, product name: EHPE-3150 by Daicel Chemical Industries, Ltd.). Resin materials represented by the general formula (a) and (b) are also available as commercial products. These commercially available resin materials have previously been used for printed circuit boards, powder paints and the like, but have not been used for a wall material for a recording liquid in a liquid ejection recording apparatus according to the present invention.

The acid anhydride used for forming a wall material for a recording liquid is an agent having the function of curing the above-described cyclic aliphatic epoxy resin, that is, a hardener. As the hardener, there are, for example, methyl tetrahydro phthalic anhydride, methyl hexahydro phthalic anhydride, methyl and methylene tetrahydro phthatic anhydride, hexahydro phthalic anhydride, dodecenyl succinic anhydride, phthalic anhydride, tetrahydro phthalic anhydride, chlorendic anhydride, trialkyl tetrahydro phthalic anhydride, trimellitic anhydride, pyromellitic anhydride, benzophenone tetracarboxylic anhydride, ethylene glycol bis-trimellitic anhydride esters, and the like.

The wall material for a recording liquid in the present invention is a cured substance for the formation of which the above-described cyclic aliphatic epoxy resin and acid For illustrative purposes only, the reaction of the cyclic aliphatic epoxy resins with an acid anhydride may be represented as follows:

The cyclic aliphatic epoxy resin of formula (a)

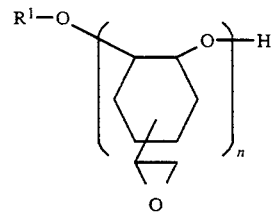

wherein n=5 has the basic structure:

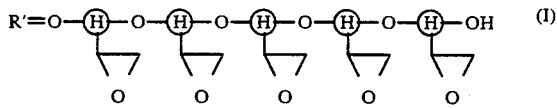

The acid anhydride may be, for example, phthalic anhydride having the structure:

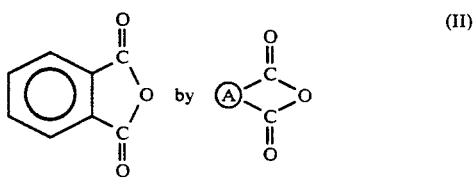

The reaction of (I) and (II) forms a highly cross-linked structure such as (III):

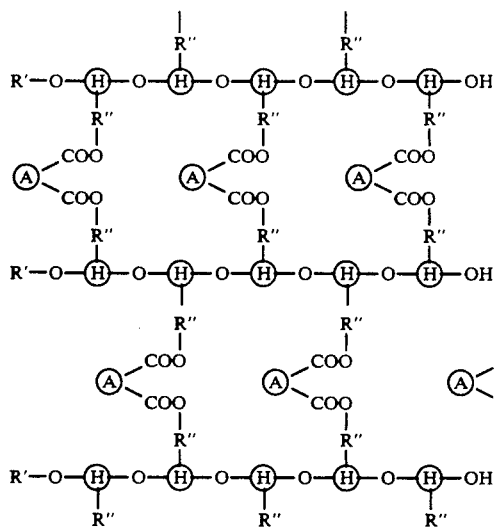

The reaction parameters between the cyclic aliphatic epoxy resins and acid anhydride will be apparent to those with ordinary skill in this field. In general, the preferred proportions of reactants is based on the number of epoxide groups x(2)=number of molecules of acid anhydride.

The reaction time is preferably between about 1 and 24 hours and the preferred reaction temperature is between about 120° C. and 210° C. Most preferably, the reaction time is from 1 to 4 hours and the reaction temperature from 150°–210° C. The reaction catalysts may be, typically, triphenylphosphine, benzildimethylamine, diaminodiphenylmethane, as aromatic amine catalysts and, as an imidazole catalyst, 2-ethyl-4-methylimidazole. Triphenylphosphine is preferred. The selection of individual reaction parameters will depend on the exact material desired. anhydride are used as indispensable components. Other arbitrary components, for example, a cure accelerator, a release agent, carbon black and the like, may also be used within a range so as not to deteriorate desired properties. As the cure accelerator, there are, for example, tertially amines, Lewis acids, boric acid esters, organometallic compounds, imidazoles and the like.

The wall material for a recording liquid in the present invention can be obtained by molding the above-described indispensable components and arbitrary components if desired. The molding method is not specifically limited. The molding may, for example, be performed by a method in which liquid composites are subjected to casting molding, a method in which preimpregnated (softened by heating) solid composites are subjected to compression molding or transfer molding, and the like.

The present invention will now be explained in detail according to embodiments.

EXAMPLE 1

An epoxy resin material having the structure represented by the following general formula (a-1) (product name: EHPE-3150 by Daicel Chemical Industries, Ltd.):

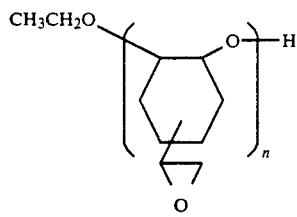

(in the formula, n indicates 6), and hexahydro phthalic anhydride, functioning as a hardener, having the following general formula (0-1):

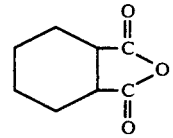

were mixed in the equivalent ratio of hardener/epoxy resin=0.6. The mixture was preimpregnated by reaction at 100° C. for 1 hour, and was subjected to transfer molding at 180° C. to provide a top plate for a liquid ejection recording apparatus.

EXAMPLE 2

An epoxy resin material identical to that used in Example 1 except that the degree of polymerization n in the general formula (a-1) is 15 and the same hardener as in Example 1 were mixed in the equivalent ratio of hardener/epoxy resin=0.6, and 2 mol % of benzyl methyl amine, functioning as a cure accelerator, was added thereto. The resultant mixture was subjected to press molding at 170° C. for 2.5 hours to provide a top plate for a liquid ejection recording apparatus.

EXAMPLE 3

An epoxy resin material having the structure represented by the following general formula (b-1):

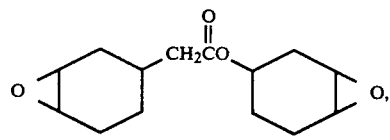

and tetrahydro phthalic anhydride, functioning as a hardener, having the structure represented by the following general formula (0-2):

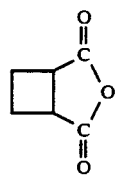

were mixed in the equivalent ratio of hardener/epoxy resin=0.6. The mixture was subjected to casting molding at 150° C. for 8 hours to provide a top plate for a liquid ejection recording apparatus.

EXAMPLE 4

An epoxy resin material having the structure represented by the following general formula (c) (a product of Daicel Chemical Industries, Ltd.):

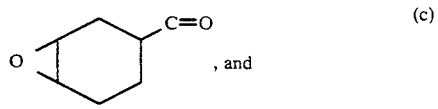

the same tetrahydro phthalic anhydride, functioning as a hardener, as in Example 3 were mixed in the equivalent ratio of hardener/epoxy resin=0.6. The mixture was subjected to casting molding at 120° C. for 5 hours to provide a wall-material top plate for a recording liquid for a liquid ejection recording apparatus.

COMPARATIVE EXAMPLE 1

A phenolnovolac-epoxide-resin-type epoxy resin material (product name: XNR-6302 by Nagase & Company, Ltd.) and methyl hexahydro phthalic anhydride, functioning as a hardener, were mixed. The mixture was subjected to casting molding to provide a top plate for a liquid ejection recording apparatus.

COMPARATIVE EXAMPLE 2

A diallylphthalate resin material (trade mark: Dapren by Osaka Soda Co., Ltd.) was subjected to injection molding to provide a top plate for a liquid ejection recording apparatus.

COMPARATIVE EXAMPLE 3

A polyether imide resin material (trade mark: Ultem 1000 by ELP) was subjected to injection molding to provide a top plate for a liquid ejection recording apparatus.

COMPARATIVE EXAMPLE 4

An epoxy resin material using an epichlorohydrin-type hardener (product name: T-472/R102 by Nagase & Company, Ltd.) was subjected to injection molding to provide a top plate for a liquid ejection recording apparatus.

For respective members provided in the above-described Examples 1–4 and Comparative Examples 1–4, the following evaluation was performed.

Evaluation Relative to the Recording-Liquid-Resistant Property (the Degree of Elution)

For each of the members provided in Examples and Comparative Examples, about 10 g of the member (a plurality of top plates) was held in a teflon receptacle, and was immersed in a liquid having a weight of 20 times that of the member. Two kinds of liquids, that is, distilled water, and a mixed solution of diethylene glycol, ethanol and water in a weight ratio of 15:5:80, were used.

Covered with an aluminum foil, the receptacle was heated and pressurized in a pressure cooker tester in a saturation vapor pressure mode at 120° C. for 10 hours (this liquid will hereinafter be termed the "test liquid").

Furthermore, without having the member in the teflon receptacle, only the liquid (distilled water or the above-described mixed solution) was similarly heated and pressurized (this liquid will hereinafter be termed the "blank liquid").

In order to know what kinds and quantities of impurities has been dissolved within the above-described test liquid, the following analysis was performed:

Ultraviolet Absorption Sectra (UV)

Using U-3200 made by Hitachi, Ltd. as an analyzer, ultraviolet absorption spectra were measured for the test liquids and blank liquids, and the existence of organic impurities was investigated from differences in absorption in the wavelength of 180–400 nm. The results are shown in Table 1. In Table 1, the mark ◯ indicates that there is little difference in absorption between the test liquid and blank liquid, and the mark X indicates that there is a difference of 0.1 abs or more.

Organic Carbon Content

Using TOC-500 made by Shimazu Corporation, organic carbon contents (ppm) within the test liquids of distilled water and the blank liquids of distilled water were measured and analyzed. The results are shown in Table 1.

Gas Chromatography (GC)

HP-5890 made by Hewlett-Packard Corp. was used as an analyzer. OV-17 column of 0.53 mm (id)×10 m was used, and the column temperature was 10° C. /min. at 140°–320° C. FID was used as a detector, and the injected amount was 3 μl.

Chromatographs were obtained for the test liquids and blank liquids under the above-described conditions, and the existence of organic impurities was investigated from differences in chromatographs. The results are shown in Table 1. In Table 1, the mark ◯ indicates that there is little difference in chromatographs between the test liquid and blank liquid, and the mark X indicates that the number of detected peaks clearly increases.

pH pH's were measured for the test liquids. The results are shown in Table 1.

Dissolved Amounts of Fe Components and Si Components

For the test liquids of distilled water, the concentrations (ppm) of Fe components and Si components were measured in a quantitative mode using an ICP emission spectral analyzer (SPS1100-H made by Seiko Denshi Co.). The results are shown in Table 1.

Dissolved amounts of Na components and K components

For the test liquids of distilled water, the concentrations (ppm) of Na components and K components were measured using an atomic absorption analyzer (AA-670 made by Shimazu Corporation). The results are shown in Table 1.

Dissolved Amounts of Cl Components

For the test liquids of distilled water, the concentrations (ppm) of Cl were measured using an ion chromatographic analyzer (DIONEX 2010i). The results are shown in Table 1.

As is apparent from the results shown in Table 1, the members provided in Examples 1–4 have smaller elution of impurities (organic or inorganic substances) in distilled water and the mixed solution of diethylene glycol, ethanol and water than the members provided in Comparative Examples 1–4. Consequently, the members provided in Examples 1-4 also have smaller changes in pH of the liquids. Although the evaluation tests were performed for distilled water and the mixed solution, it is self-explanatory from these results that the same results may be obtained for a recording liquid (ink) usually used in a liquid ejection recording apparatus.

Evaluation of the Recording-Liquid-Resistant Property (Surface State and Weight Change)

For each member after the above-described heating and pressurizing evaluation test for the degree of elution had been performed, the following evaluation for the recording-liquid-resistant property was performed.

Surface State

The existence of a change in the surface state of each member before and after heating and pressurizing operations was determined by visual inspection. The results are shown in Table 2. In Table 2, the mark ◯ indicates that there is little change in the surface state.

Weight Change

Weight changes (%) before and after heating and pressurizing operations were measured. The results are shown in Table 2.

Evaluation of Transparency

For each member (5 mm thick) provided in Examples and Comparative Examples, transparency at the wavelength of 190-600 nm was measured using a measuring apparatus, U-3200 made by Hitachi, Ltd. The results are shown in Table 2. Since a UV (ultraviolet) hardener cannot be used for a material which absorbs light at the wavelength 350 nm or more, it is preferred to use a material transparency of which becomes 50% or less at the wavelength of 350 nm or less.

Evaluation of the Heat-Resistant Property

Known data of thermal deformation temperature or glass transition temperature for each material according to a commercial manufacturer and the like are shown in Table 2.

Evaluation of Cost

The cost for each material used in each Example and the price for each piece of member (a top plate) provided in each Example are shown in Table 2. As a conventional example, the price for each piece of top plate made of borosilicate glass is shown in Table 2 for the purpose of comparison.

Summary of the Evaluation

The synthetic evaluation for Examples and Comparative Examples obtained from the results shown in Tables 1 and 2 is shown in Table 3. In Table 3, the mark ◯ indicates that the sample is sufficiently suitable relative to the properties required for the relating item, and the mark x indicates that the sample is insufficient or has no allowance relative to the required properties. The determination for either ◯ or x was made in the following ways.

The Degree of Elution in The Recording Liquid

The mark "suitable" (◯) was given for a sample which has the marks ◯ for the evaluation results of ultraviolet absorption spectra and gas chromatography and which has an organic carbon content of 10 ppm or less with the amount for the blank liquid subtracted because it is suitable for a member constituting a wall material for a recording liquid. The marks "insufficient" (X) were given for other samples.

Surface State and Weight Change

The mark "suitable" (◯) was given for a sample which has the evaluation ◯ for the surface state and a weight change of ±2.0% or less because it is suitable for a member constituting a wall material for a recording liquid. The marks "insufficient" (X) were given for other samples.

Transparency

The mark "suitable" (◯) was given for a sample the transparency of which is 50% or less at a wavelength of 380 nm or less because it is suitable for a member requiring transparency, such as a top plate or the like. The marks "insufficient" (X) were given for other samples.

Heat-Resistant Property

The mark "suitable" (◯) was given for a sample the thermal deformation temperature or glass transition temperature of which is 180° C. or more because it is suitable for a member constituting a recording head or the like. The marks "insufficient" (X) were given for other samples.

Cost

Since all the members provided in Samples and Comparative Samples are made of resin, they are more advantageous in the viewpoint of cost than conventional members made of inorganic glass. Hence, the marks "suitable" (◯) were given.

As is apparent from the results summarized in Table 3, the members in Examples are superior as members constituting wall materials for recording liquids (in particular, top plates) from a synthetic point of view.

TABLE 1

| | | Evaluation for the degree of elution of impurities into a recording liquid | | | | | | | | |
|---|---|---|---|---|---|---|---|---|---|---|
| | | Organic substances | | | | Inorganic substance | | | | |
| | Test liquid | UV | TOC (PPM) | GC | pH | Na (PPM) | K (PPM) | Si (PPM) | Fe (PPM) | Cl (PPM) |
| Example 1 | $H_2O$ | ◯ | 0 | ◯ | 5.17 | 0.01 | 0 | 0.03 | 0 | 0 |
| | solvents included | ◯ | — | ◯ | 6.61 | — | — | — | — | — |
| Example 2 | $H_2O$ | ◯ | 0 | ◯ | 6.72 | 0.02 | 0.02 | 0 | 0 | 0 |
| | solvents included | ◯ | — | ◯ | 6.25 | — | — | — | — | — |
| Example 3 | $H_2O$ | ◯ | 0 | ◯ | 6.10 | 0.11 | 0.07 | 0 | 0 | 0 |
| | solvents included | ◯ | — | ◯ | 6.31 | — | — | — | — | — |
| Example 4 | $H_2O$ | ◯ | 0 | ◯ | 5.95 | 0.02 | 0.01 | 0.75 | 0 | 0 |
| | solvents included | ◯ | — | ◯ | 6.00 | — | — | — | — | — |
| Example | $H_2O$ | | 0 | | 6.90 | 0.01 | 0.04 | 0.15 | 0 | 0 |

TABLE 1-continued

Evaluation for the degree of elution of impurities into a recording liquid

| | Test liquid | Organic substances | | | Inorganic substance | | | | |
| --- | --- | --- | --- | --- | --- | --- | --- | --- | --- |
| | | UV | TOC (PPM) | GC | pH | Na (PPM) | K (PPM) | Si (PPM) | Fe (PPM) | Cl (PPM) |
| BLK | solvents included | | — | | 6.96 | — | — | — | — | — |
| Comparative Example 1 | H₂O | X | 70 | X | 3.67 | 0.11 | 0.04 | 0 | 0 | 6.8 |
| | solvents included | X | — | ○ | 3.42 | — | — | — | — | — |
| Comparative Example 2 | H₂O | X | 15 | X | 5.57 | 0.06 | 0.28 | 0.17 | 0 | 0.90 |
| | solvents included | X | — | ○ | 3.55 | — | — | — | — | — |
| Comparative Example 3 | H₂O | ○ | 10 | ○ | 4.15 | 0.11 | 0.07 | 0 | 0 | 6.8 |
| | solvents included | ○ | — | ○ | 3.55 | — | — | — | — | — |
| Comparative Example 4 | H₂O | ○ | 30 | X | 3.53 | 0.23 | 0.32 | 0 | 0 | 11 |
| | solvents included | X | — | ○ | 3.35 | — | — | — | — | — |
| Comparative Example BLK | H₂O | | 0 | | 6.60 | 0.05 | 0.04 | 0.15 | 0 | 0 |
| | solvents included | | — | | 3.52 | — | — | — | — | — |

TABLE 2

Evaluation of properties

| | Recording-liquid-resistant property of material(*) | | Transparent characteristic T = 50% (nm) | Thermal deformation temperature or Tg (°C.) |
| --- | --- | --- | --- | --- |
| | H₂O | Solvents included | | |
| Example 1 | +0.8(%) ○ | +0.9(%) ○ | 340 | 214 |
| Example 2 | +0.9(%) ○ | +0.7(%) ○ | ↑ | 192 |
| Example 3 | +0.5(%) ○ | +0.8(%) ○ | ↑ | 203 |
| Example 4 | +0.8(%) ○ | +1.1(%) ○ | ↑ | 183 |
| Comparative Example 1 | +2.2(%) microparticles | +2.4(%) ○ | 400 | 120 |
| Comparative Example 2 | +0.8(%) ○ | +1.1(%) ○ | 390 | 230 |
| Comparative Example 3 | +0.9(%) ○ | +0.7(%) ○ | 380 | 200 |
| Comparative Example 4 | +3.8(%) fine cracks | +3.5(%) ○ | 380 | 136 |
| Borosilicate glass | | | | |

Costs

| | Raw materials (yen/kg) | Price for one piece of top plate |
| --- | --- | --- |
| Example 1 | about 3000 | 500 yen/piece |
| Example 2 | about 3000 | 500 yen/piece |
| Example 3 | about 3000 | 500 yen/piece |
| Example 4 | about 3000 | 500 yen/piece |
| Comparative Example 1 | about 3000 | |
| Comparative Example 2 | about 3000 | |
| Comparative Example 3 | about 4000 | |
| Comparative Example 4 | about 3000 | |
| Borosilicate glass | | 5000 yen/piece |

(*)The upper column indicates weight change and the lower column indicates a change in the state.

TABLE 3

Summary of the evaluation results

| | Degree of elution in recording liquid | Recording-liquid-resistant property of material | Transparent characteristics | Heat-resistant property | Cost |
| --- | --- | --- | --- | --- | --- |
| Example 1 | ○ | ○ | ○ | ○ | ○ |
| Example 2 | ○ | ○ | ○ | ○ | ○ |
| Example 3 | ○ | ○ | ○ | ○ | ○ |
| Example 4 | ○ | ○ | ○ | ○ | ○ |
| Comparative Example 1 | X | X | ○ | X | ○ |
| Comparative Example 2 | X | ○ | X | ○ | ○ |
| Comparative Example 3 | ○ | ○ | X | ○ | ○ |
| Comparative Example 4 | X | X | ○ | X | ○ |

Although an explanation has so far been provided of examples in which top plates made of resin composites according to the present invention were used as liquid-path walls, the resin composites may also favorably be utilized for other portions in the recording head.

Concrete examples of application are shown in FIGS. 2(a)-2(h) which represent partial cross sections of recording heads vertical to liquid paths.

The resin composites are utilized 1. as a cover 215 (FIG. 2(a)),
2. as liquid-path walls 212 and as a cover 215 (FIG. 2(b)) (in this case, the liquid-path walls 212 and the cover 215 may be formed as one body, or may separately be formed and connected together thereafter),
3. as an intermediate layer 214 between liquid-path walls 212 and a cover 215 made of various kinds of resin materials (FIGS. 2(c), 2(e) and 2(g)),
4. as liquid-path walls 212 and an intermediate layer 214 between the liquid-path walls 212 and a cover 215 (FIGS. 2(d) and 2(f)), and
5. as liquid-path walls 212 and intermediate layers 214 (two-layer structure) between the liquid-path walls 212 and a cover 215.

Figure 2:
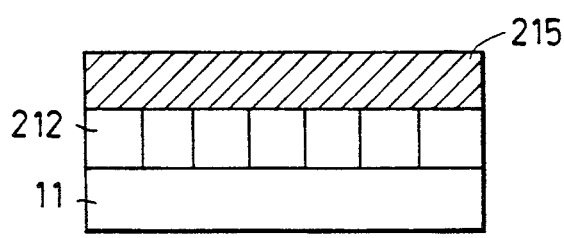
FIGS. 2(a)–2(h) are cross-sectional views, in models, of liquid ejection recording heads.
Figure 2:
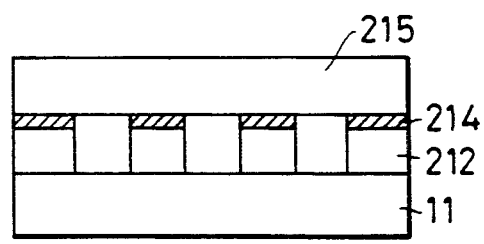
Figure 2:
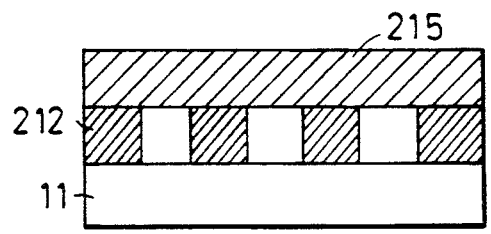
Figure 2:
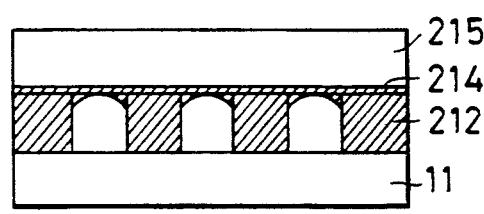
Figure 2:
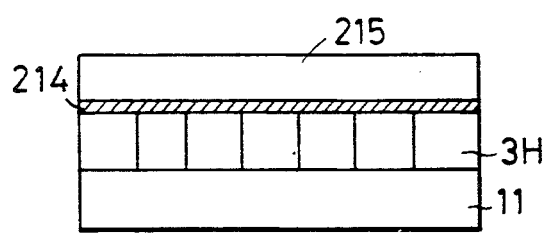
Figure 2:
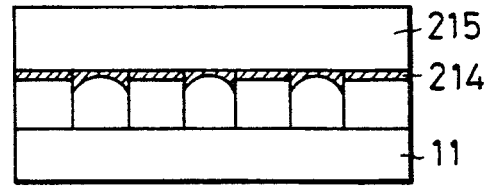
Figure 2:
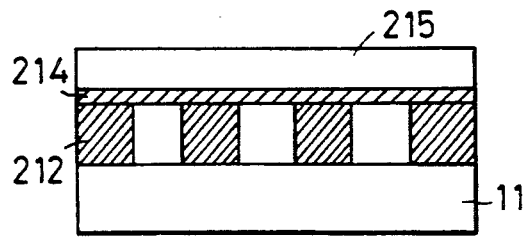
Figure 2:
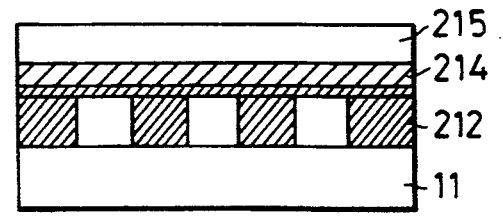
Figure 3A:
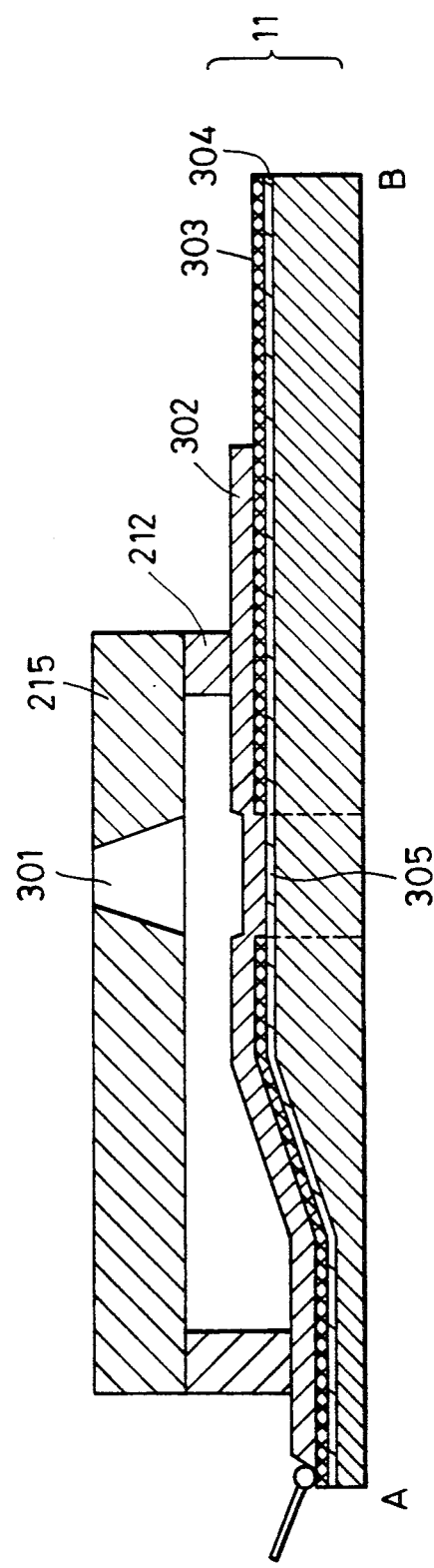
FIG. 3(a) is a cross-sectional view, in a model, of a liquid ejection recording head.
Figure 4:
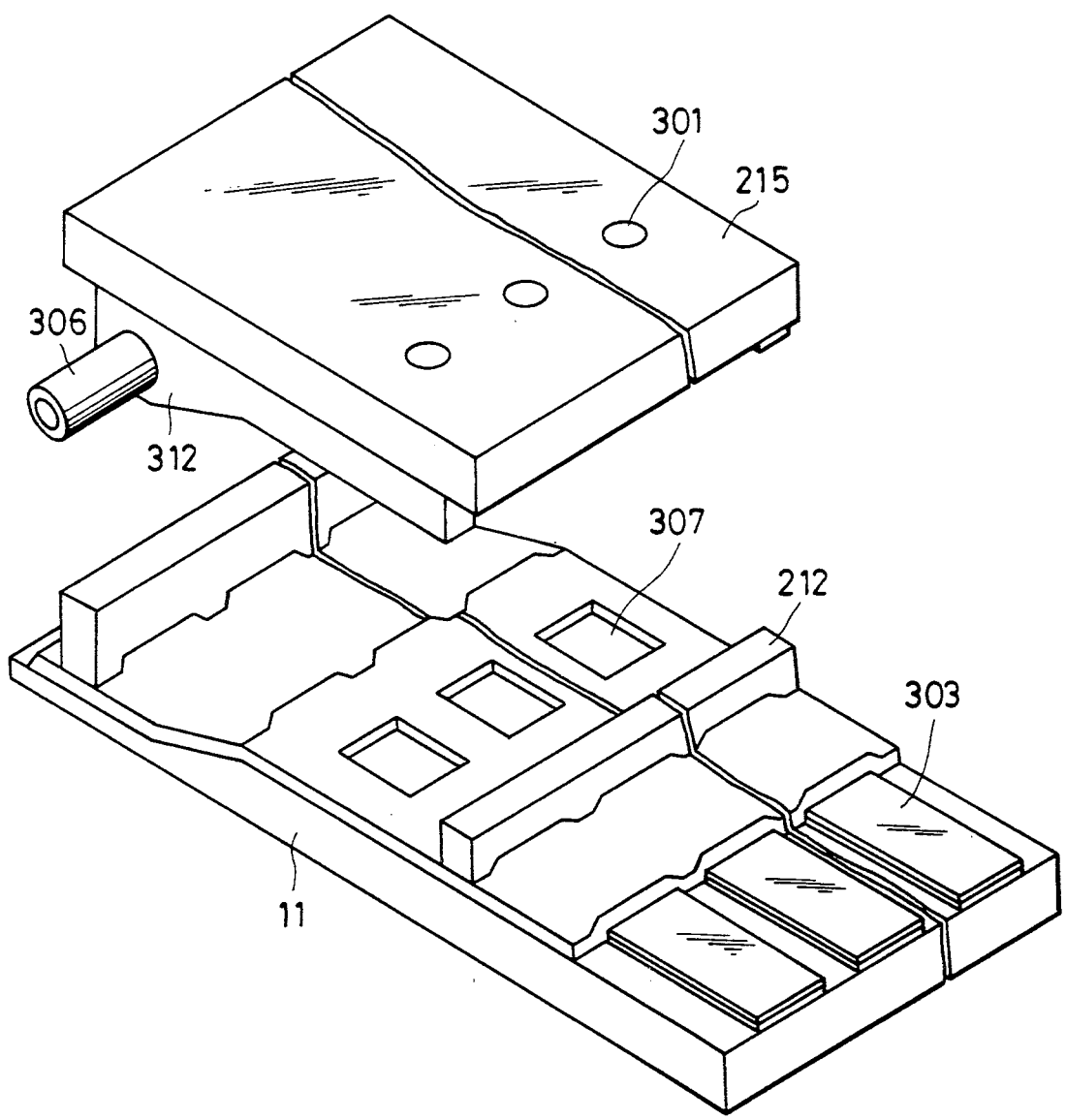
FIG. 4 is an assembling perspective view, in a model, of the head shown in FIG. 3(a)
Figure 5:
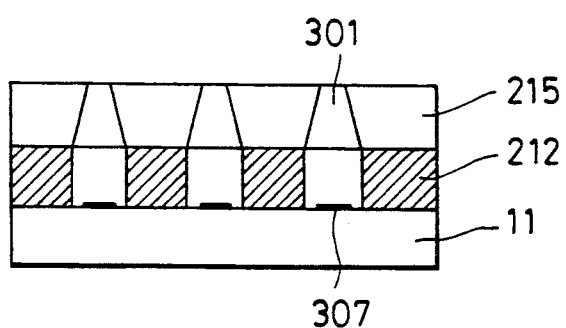
FIGS. 5(a) and 5(b) are cross-sectional views, in models, of recording heads.
Figure 5:
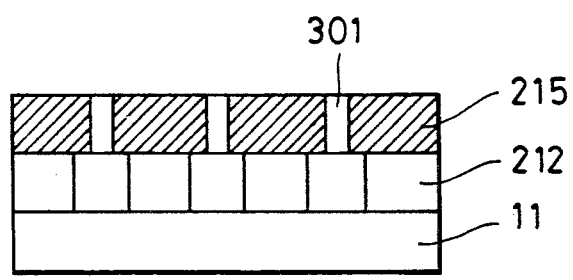

Furthermore, the recording head of the present invention may have the structure of ejecting liquid drops in a direction vertical to a liquid path (6-2), as shown in FIGS. 3(a), 3(b) and 4. In these cases, cured films of the resin composites may favorably be utilized in the same portions as shown in FIG. 2, such as portions shown in FIGS. 5(a) and 5(b).

Figure 3:
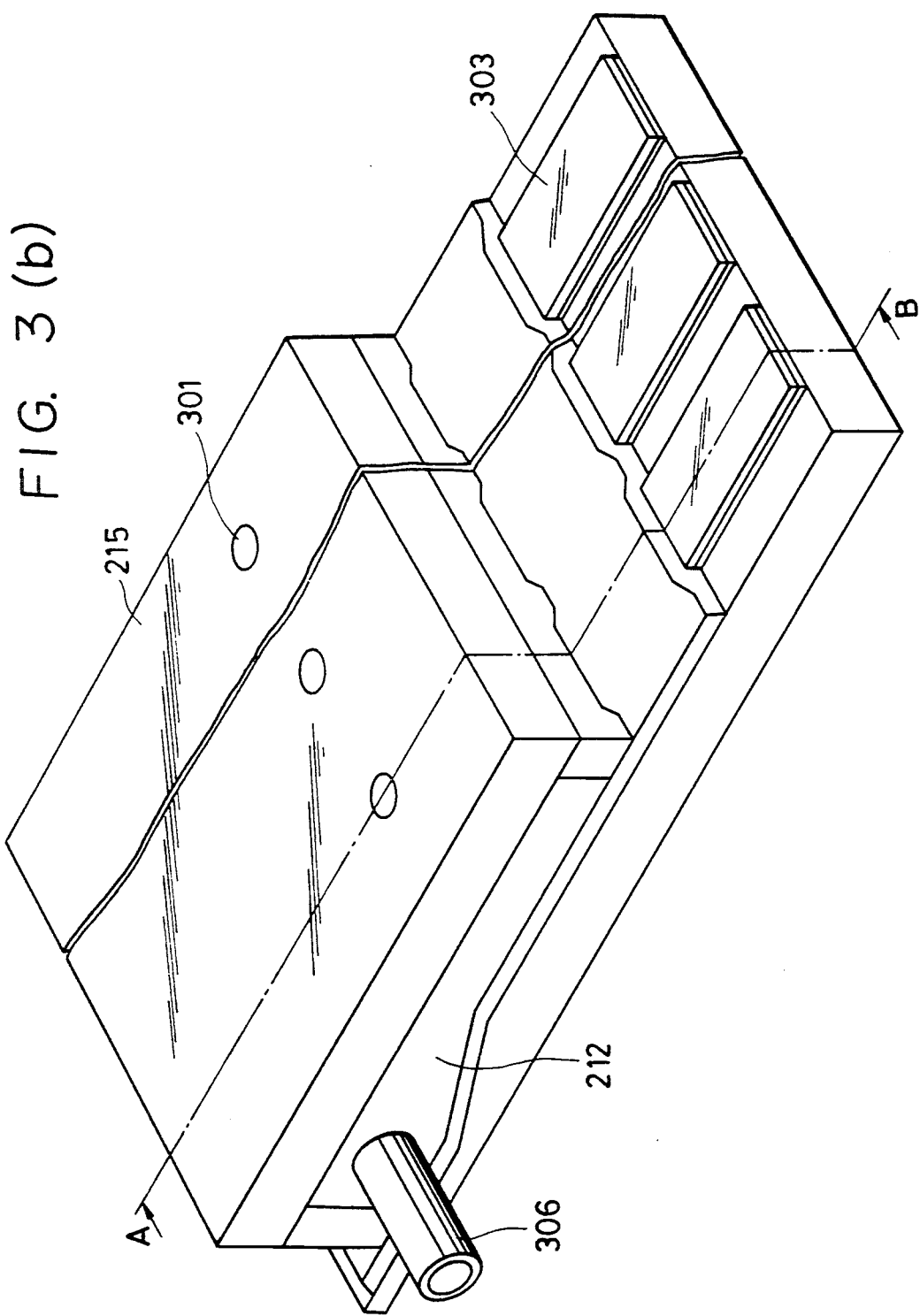
FIG. 3(b) is a perspective view, in a model, of the head shown in FIG. 3(a)

In FIGS. 3 and 4, there are shown discharge openings 301, a protective layer 302, electrodes 303, a heating resistor layer 304, a heat generation unit 305, a supply tube 306, and heat operation units 307.

A suitable recording apparatus to which the above-described recording head of the present invention is applied will now be explained with reference to the drawings.

Figure 6:
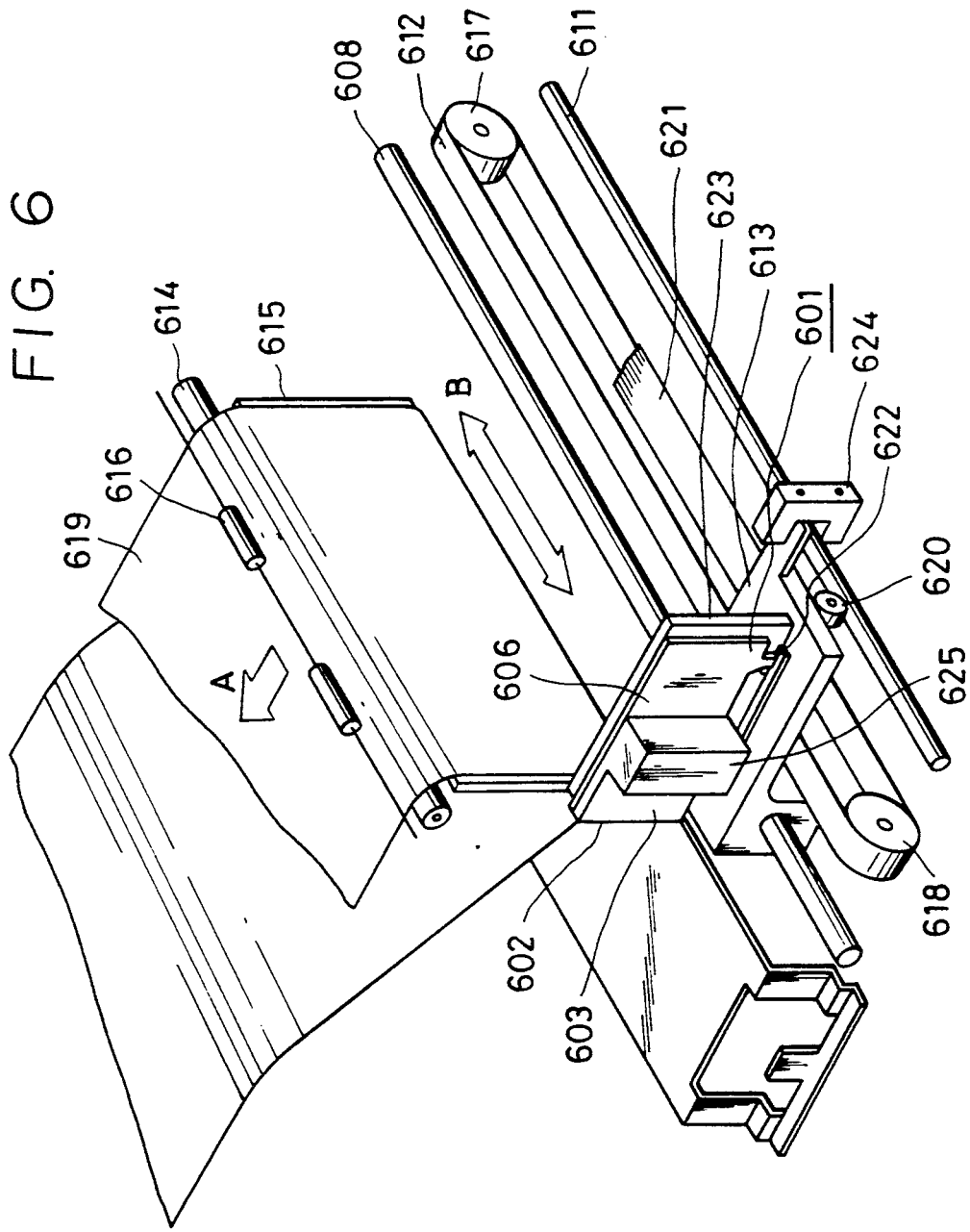
FIG. 6 is a perspective view, in a model, showing an example of the recording apparatus which can be applied to the present invention.

FIG. 6 is a perspective view schematically showing an embodiment of the liquid ejection recording apparatus of the present invention. In FIG. 6, there is shown recording paper 619. The recording paper 619 is moved on a platen 615 at a predetermined speed in the subsidiary scanning direction (the direction of arrow A) by a paper feeding roller 614 and a pinch roller 616. Pulleys 617 and 618 are supported on respective shafts and are rotated by a drive source (not shown). A carriage driving belt 612 is passed over the pulleys 617 and 618.

A carriage 613 is integrally fixed to the carriage driving belt 612. The carriage 613 is guided by guide shafts 608 and 611 and is reciprocally movable in the major scanning directions (the directions of arrow B) by the rotation of the pulleys 617 and 618.

A roller 620 adapted to roll on the guide shaft 611 is disposed on the underside of the carriage 613.

A connector 622 electrically connected to flexible wiring 621 is disposed substantially in the central portion of the carriage 613, and a head aligner 623 for aligning the liquid ejection recording head (hereinafter termed the recording head) 601 when the wires of the recording head 601 are connected and fixed to the connector 622 is vertically provided on the carriage 613. Accordingly, the recording head 601 is removable from the carriage 613 by the connector 622. Also, a sensor 624 for detecting the home position of the carriage 613 is provided.

The recording head 601 has a substrate 606, which in turn has thereon discharge ports 602 for discharging ink droplets which are flying droplets, a liquid path constituting portion 603 for constituting liquid paths communicating with the discharge ports 602 and having energy generating members such as heat generating elements for forming flying ink droplets, and an ink chamber for storing therein ink to be supplied to the liquid paths. To the energy generating members of the recording head 601, a driving voltage is supplied from a driving voltage generating circuit through the connector 622 and the flexible wiring 621 and also, a discharge control signal for controlling the discharge of ink droplets from the discharge ports 602.

As explained above, the wall material for a recording liquid of the present invention can fully satisfy requirements for various properties.

The wall material has an excellent recording-liquid-resistant property, and can satisfy practical requirements, such as a heat-resistant property, transparency, workability, cost and the like, for a liquid ejection recording head and a supply system using the material.

Furthermore, a recording apparatus which uses the material in a portion contacting a recording liquid can maintain extremely stable properties for a long period at low cost, and has excellent performance also from a practical point of view.

What is claimed is:

1. A material for use in a liquid ejection recording apparatus that is contactable with a recording liquid, said material comprising a cured substance formed by reacting:

(1) a cyclic aliphatic epoxy resin represented by a general formula selected from the group consisting of general formula (a):

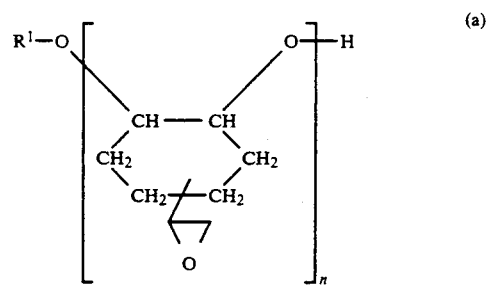

wherein, in formula (a), $R^1$ indicates a residual radical of monohydric or polyhydric alcohol; general formula (b):

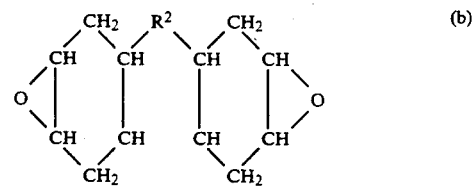

wherein, in formula (b), $R^2$ indicates $CH_2CO_2R^3CO_2CH_2$ or $CH_2CO_2$, where $R^3$ indicates a divalent hydrocarbon radical having a valence bond or 1-9 carbon atoms; and general formula (c):

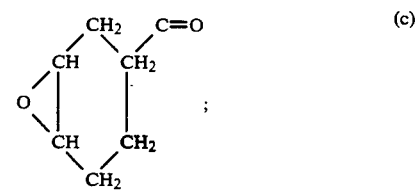

(2) and an acid anhydride.

2. A liquid ejection recording head having a discharge opening for discharging a recording liquid, wherein at least a portion of said liquid ejection recording head that is contactable with said recording liquid comprises a cured substance formed by reacting:

(1) a cyclic aliphatic epoxy resin represented by a general formula selected from the group consisting of general formula (a):

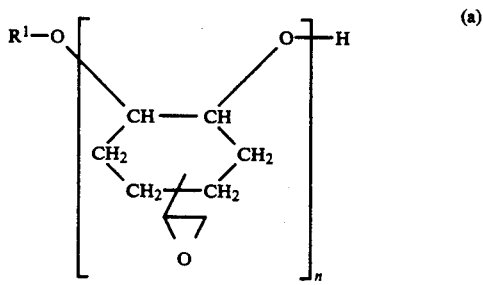

wherein, in formula (a), $R^1$ indicates a residual radical of monohydric or polyhydric alcohol; general formula (b):

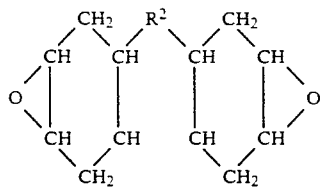

wherein, in formula (b), $R^2$ indicates $CH_2CO_2R^3CO_2CH_2$ or $CH_2CO_2$, where $R^3$ indicates a divalent hydrocarbon radical having a valence bond or 1-9 carbon atoms; and the following general formula (c):

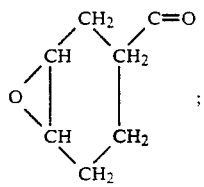

(2) and an acid anhydride.

3. A liquid ejection recording head according to claim 2, wherein said portion is a member in which discharge openings for discharging ink are formed.

4. A liquid ejection recording head according to claim 2, wherein said portion is a member for defining a liquid path communicating with discharge openings for discharging ink.

5. A liquid ejection recording head according to claim 4, wherein said member for defining the liquid path is a wall of the liquid path.

6. A liquid ejection recording head according to claim 2, wherein said liquid ejection recording head includes discharge energy generating elements.

7. A liquid ejection recording head according to claim 6, wherein said discharge energy generating elements are heat generating elements.

8. A liquid ejection recording head according to claim 6, wherein said discharge energy generating elements are piexoelectric elements.

9. A liquid ejection recording head according to claim 6, wherein said discharge openings for discharging ink in the liquid ejection recording head are provided at a position facing said discharge energy generating elements.

10. A liquid ejection recording head according to claim 2, wherein said liquid ejection recording head includes a member for defining a liquid path communicating with discharge openings for discharging ink, wherein said portion of said liquid ejection recording head formed of said cured substance is a plane plate provided at said member for defining a liquid path.

11. A liquid ejection recording apparatus comprising:
(a) a liquid ejection recording head for discharging a recording liquid;
(b) a control circuit unit for driving said liquid ejection recording head;
(c) a platen for locating therealong a recording material that records information by application of said recording liquid;
wherein at least a portion of said liquid ejection recording apparatus that is contactable with at least one of said liquid ejection recording head and said recording liquid comprises a cured substance formed by reacting:
(1) a cyclic aliphatic epoxy resin represented by a general formula selected from the group consisting of general formula (a):

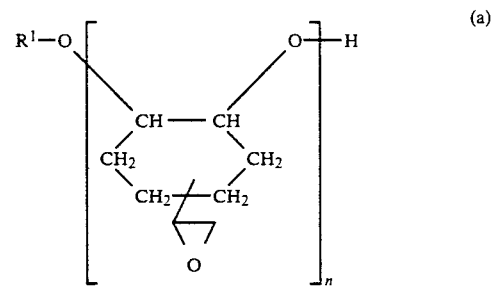

wherein, in formula (a), $R^1$ indicates a residual radical of monohydric or polyhydric alcohol; general formula (b):

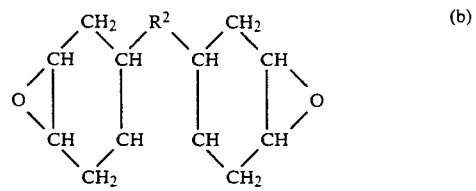

wherein, in formula (b), $R^2$ indicates $CH_2CO_2R^3CO_2CH_2$ or $CH_2CO_2$, where $R^3$ indicates a divalent hydrocarbon radical having a valence bond or 1-9 carbon atoms; and general formula (c):

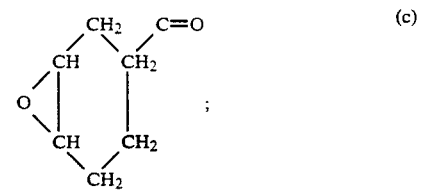

(2) and an acid anhydride.

12. A liquid ejection recording apparatus according to claim 11, wherein said at least a portion of said liquid ejection recording apparatus is a member for forming a supply path for said recording liquid.

13. A method for producing a liquid ejection recording head having a discharge opening for discharging a recording liquid, comprising the step of forming at least a portion of said liquid ejection recording head that is contactable with said recording liquid with a cured substance provided by reacting:
(1) a cyclic aliphatic epoxy resin represented by the following general formula (b):

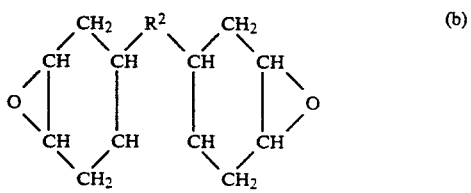

wherein, in formula (b), $R^2$ indicates $CH_2CO_2R^3CO_2CH_2$ or $CH_2CO_2$, where $R^3$ indicates a divalent hydrocarbon radical having a valence bond or 1-9 carbon atoms, and (2) an acid anhydride, wherein said portion is formed by at least one of transfer molding or casting molding.

14. A method for producing a liquid ejection recording head having a discharge opening for discharging a recording liquid, comprising the step of forming at least a portion of said liquid ejection recording head that is contactable with said recording liquid with a cured substance provided by reacting:

(1) a cyclic aliphatic epoxy resin represented by the following general formula (c), and:

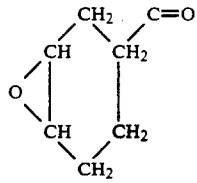

(2) an acid anhydride.

* * * * *

UNITED STATES PATENT AND TRADEMARK OFFICE
CERTIFICATE OF CORRECTION

PATENT NO. : 5,150,132

DATED : September 22, 1992

INVENTOR(S) : Shimomura et al.

It is certified that error appears in the above-identified patent and that said Letters Patent is hereby corrected as shown below:

TITLE PAGE
ABSTRACT:

Line 6, "liquid" should read --liquid ejection--.

COLUMN 1:

Line 27, delete "a".

COLUMN 6:

Line 22, "phthatic" should read --phthalic--; and

Lines 29-32 should be deleted.

COLUMN 7:

Line 41, "anhydride are used as" should be deleted; and

Line 42, before "indispensable" insert: --¶ The wall material for a recording liquid in the present invention is a cured substance for the formation of which the above-described cyclic aliphatic epoxy resin and acid anhydride are used as--.

COLUMN 10:

Line 5, "Sectra" should read --Spectra--.

UNITED STATES PATENT AND TRADEMARK OFFICE
CERTIFICATE OF CORRECTION

PATENT NO. : 5,150,132
DATED : September 22, 1992
INVENTOR(S) : Shimomura et al.

It is certified that error appears in the above-identified patent and that said Letters Patent is hereby corrected as shown below:

COLUMN 17:

Line 45, "piexoelectric" should read --piezoelectric--.

COLUMN 20:

Line 2, ":" should be deleted.

Signed and Sealed this

Fourteenth Day of December, 1993

Attest:

BRUCE LEHMAN

Attesting Officer

Commissioner of Patents and Trademarks